F. C. CARSTARPHEN.
LOAD HANDLING AND MEASURING DEVICE.
APPLICATION FILED DEC. 4, 1918.
1,341,297.
Patented May 25, 1920.
2 SHEETS—SHEET 2.
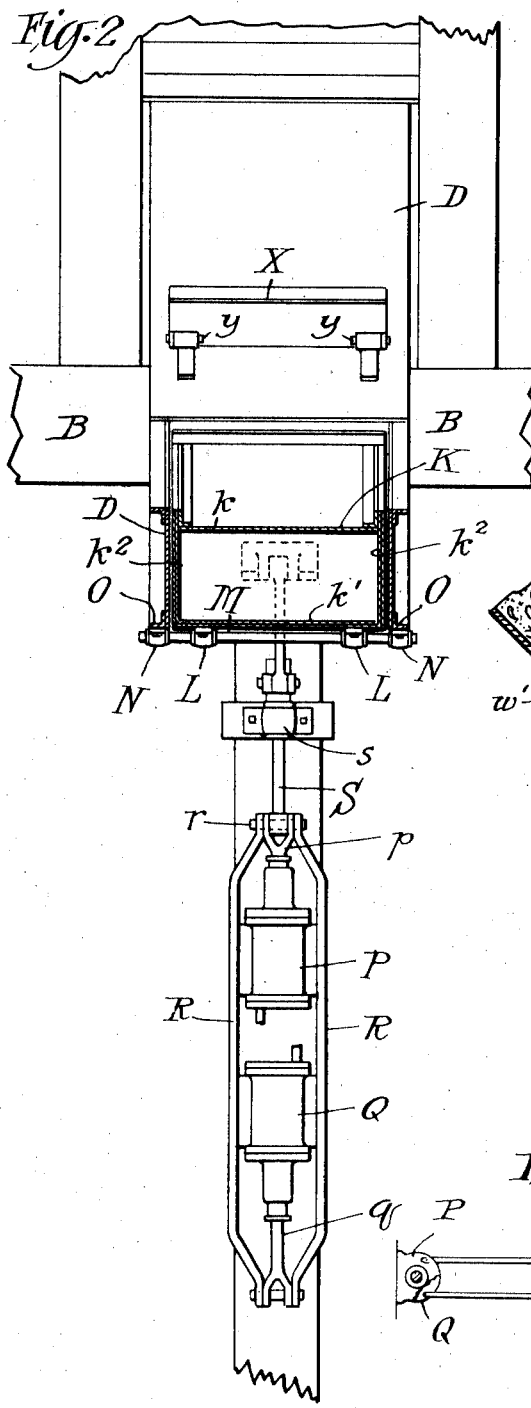
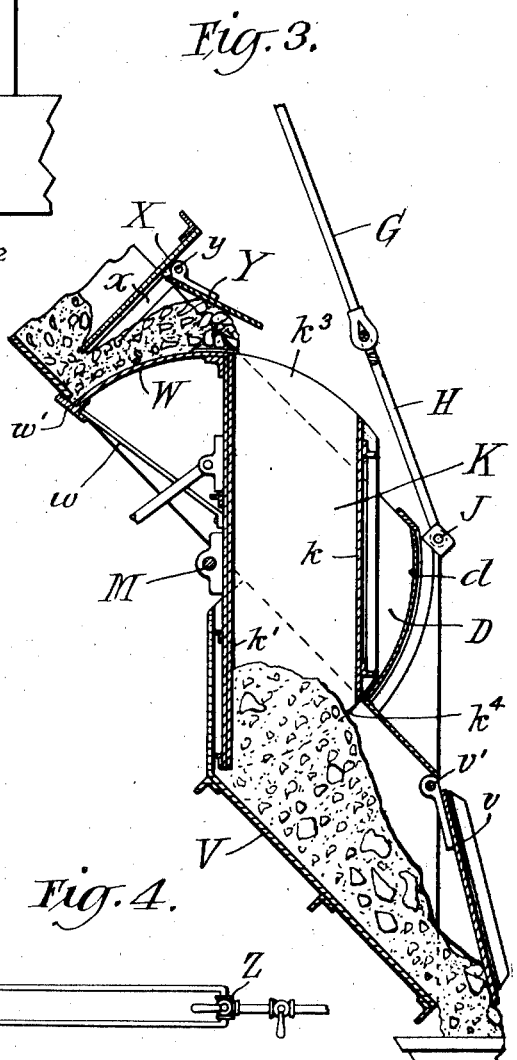
INVENTOR
F. C. CARSTARPHEN
BY
D. Anthony Usina
ATTORNEY

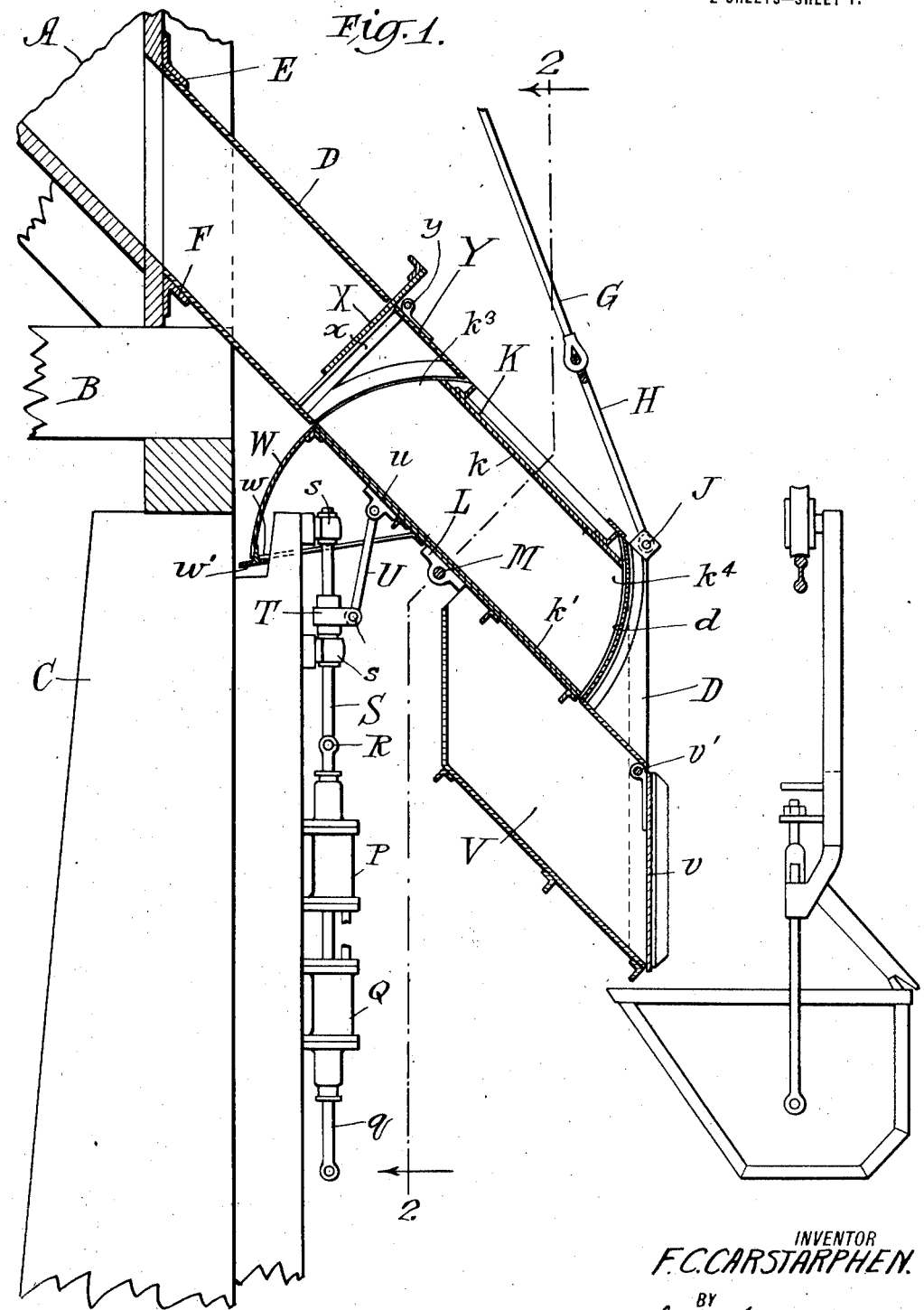

UNITED STATES PATENT OFFICE.

FREDERICK C. CARSTARPHEN, OF TRENTON, NEW JERSEY, ASSIGNOR TO THE AMERICAN STEEL AND WIRE COMPANY OF NEW JERSEY, A CORPORATION OF NEW JERSEY.

LOAD HANDLING AND MEASURING DEVICE.

1,341,297.  Specification of Letters Patent.  Patented May 25, 1920.

Application filed December 4, 1918. Serial No. 265,281.

*To all whom it may concern:*

Be it known that I, FREDERICK C. CARSTARPHEN, a citizen of the United States, residing in Trenton, New Jersey, have invented certain new and useful Improvements in Load Handling and Measuring Devices, of which the following is a specification.

My invention relates to means for handling bulk material such as ores, rocks, clay and the like, and to means whereby such materials may be accurately measured prior to being discharged into suitable carriers, such as tramway buckets or mine cars.

With the usual form of chute it is difficult to properly control the discharge of the material from the storage bins, and to prevent the leakage of material due to the jamming of the gate. Many styles of chutes and gates have been devised to accomplish these purposes, but they are more or less unsatisfactory because the chute is usually closed by means of either a sliding or a hinged gate, arranged so that its edge cuts the stream of moving material from the top. As thus constructed, if the lower edge of the gate or slide encounters a large piece of material in its downward movement, the gate will become jammed and held partly open, thereby permitting the continued flow of the smaller particles of material from the chute. Such a condition is very objectionable and wasteful in attempting to load carriers of limited capacity, such as tramway buckets, mine cars and the like.

It is desirable that labor be economized to the utmost in all load handling operations, and therefore, it is advantageous that the gates or measuring devices of an equipment of this nature be operated by power driven mechanism. It is of further advantage to so design the measuring device that it will approximately equal the capacity of the tramway bucket or other carrier to be loaded or else that its volume shall be equal to a multiple of the volume of the bucket or carrier.

One of the objects of my invention is to provide a loading device which will effectively stop the flow of material therefrom when desirable. Another object is to provide a structure of this class in which the flow of the stream of material is stopped by a means which moves from the bottom of said stream outwardly. A further object is to provide an efficient measuring device by which the volume of material discharged to the bucket or carrier can be accurately gaged. Still further objects are to combine the measuring device with the device for stopping the flow of material, to control the rate of flow of material to the measuring device, to provide means to prevent the jamming of the measuring device, to provide power driven means for operating the device and to combine and organize the various elements in such a manner that they will effectively perform the various functions herein set forth.

In the drawings Figure 1 is a vertical longitudinal section showing a portion of a storage bin equipped with my improved discharge and measuring device and illustrating a typical form of cableway bucket ready to receive the material from the discharge chamber of the device;

Fig. 2 is a section on the staggered line 2—2 of Fig. 1, looking in the direction of the arrows;

Fig. 3 is a fragmentary view of parts shown in Fig. 1 illustrating a measuring flask in discharging position;

Fig. 4 is a diagrammatic illustration of the valve control for the flask operating cylinders.

The structure illustrated comprises a storage bin A supported on suitable timbers B and C, a conveyer chute D, a rocking measuring flask K having a curved plate W secured thereto and a delivery or discharge chamber V having a splash plate or door $v$ hinged thereto. The chute D is secured by means of angle brackets E and F to the face of the bin A and its lower end is supported by means of a guy rope G which is suitably connected to a yoke H which in turn is secured to the lower end of the chute by means of pins J. The measuring flask K has secured to its underside bearings L—L which are loosely supported on the shaft M. The shaft M is supported in bearings N—N fixedly secured to the side angle braces O—O of the chute D. The flask K is arranged to be moved by suitable fluid pressure actuating means for example, by pistons operating in cylinders P and Q. The piston rods $p$ and $q$ are connected together at their outer ends by means of yokes R—R. A pin $r$ connects the yokes R—R and the piston rod $p$ to a vertically movable rod S which is guided in bearings $s$—$s$, secured to the framework of the bin. A block T is fixedly secured to the rod S and is connected by means of a short link U to a bearing $u$ secured to the underside of the measuring flask K. As thus constructed it is clear that if air is admitted to the underside of the cylinder P its rod $p$ will be forced upwardly thereby also moving the rod S which movement will be transmitted through the connecting link U to the measuring flask K, thereby causing it to turn about the center of its supporting shaft M approximately to the position shown in Fig. 3.

The measuring flask K comprises a receptacle having a closed top $k$, a bottom $k'$ and sides $k^2$, the ends $k^3$ and $k^4$ being open to permit respectively the influx and discharge of the material being handled. When the chute is in closed position, the bulkhead $d$ which is fixedly secured to the end of the chute D prevents the discharge of material from the measuring flask; however, when the flask is rocked about the shaft M its open end $k^4$ will be uncovered, thereby permitting material to fall into the discharge chamber V which chamber is fixedly secured to the underside of the chute D. The discharge chamber V is provided with a door or gate $v$ hinged at $v'$ to prevent the splattering or scattering of the material as it rushes from this chamber into the bucket or carrier.

Located at the upper end of the flask K and on its underside, is a curved plate W which is braced to the underside of the flask by a suitable strap $w$ and is provided with a T-bar $w'$ which acts as a stop to limit the turning movement of the flask K.

The rate of flow of material to the flask K is capable of control by means of a gate X shown in Fig. 1 sliding on guides $x$. To prevent the flask from becoming jammed within the chute D in the event that a large piece of material is encountered as it moves upwardly, I provide a gate Y hinged at $y$ to the chute D.

In operation the sliding gate X is first adjusted so as to permit the material to flow into the measuring flask K at the desired rate, and after the flask has become filled (which can be determined by the length of time the material is allowed to flow), the operator manipulates the valve Z, shown in Fig. 4 to permit fluid pressure to enter the cylinder P which will raise the rod S and thereby turn the measuring flask about its supporting shaft M. As the flask turns the curved plate W secured to the underside thereof will cut the stream of flowing material from the bottom and eventually entirely stop its flow. Simultaneously the bottom $k'$ of the flask K will swing away from the fixed bulk head $d$ of the chute D thus permitting the material to be discharged into the chamber V. The material rushing through the chamber V will strike the splash-gate $v$ and rock it outwardly as shown in Fig. 3, thereby preventing the scattering of the material discharged and causing it to enter the bucket or other carrier in an orderly manner.

The load handling device above described provides means whereby the material being handled can be accurately measured and also prevents the escape of materials of the smaller classes due to obstructions coming into the path of the closing gate as is the case with known structures of this class. Furthermore the jamming of the measuring flask is rendered practically impossible by the provision of the hinged gate Y and the orderly delivery of the material is insured by the swinging gate $v$ secured to the discharge chamber.

While I have described with great particularity the structural features of the embodiments of my invention herein illustrated, it is clear that various modifications may be made therein by those skilled in the art without departing from the spirit and scope of the invention as defined in the appended claims.

What I claim is:—

1. A loading device including a receptacle for the material having a discharge opening, a rocking measuring flask communicating with the opening, a stop plate on the bottom of said flask adapted, when the flask is rocked, to swing upward across the discharge opening, a yielding gate at the upper side of the opening, and means on said stop plate for limiting the rocking movement of said flask.

2. In a loading device, a downwardly inclined chute for conveying material, a rocking measuring flask operatively associated therewith, fluid pressure actuated means for rocking said flask, means whereby the influx of material to the flask will be stopped and the contents thereof will be discharged when said flask is rocked and a discharge chamber having a swinging gate arranged to prevent the scattering of the material as it leaves said chamber.

3. A loading device including a receptacle for the material having a discharge opening, a rocking measuring flask communicating with said opening, a stop plate secured to said flask and adapted to close said discharge opening when said flask is rocked, a discharge chamber secured below said measuring flask adapted to receive the measured material, and a swinging gate arranged to prevent scattering of material leaving said chamber.

4. In a loading device a downwardly inclined chute for conveying material, a rocking measuring flask pivotally mounted in said chute, said flask having open ends for the reception and discharge of material, a bulkhead secured to the lower end of said chute, said bulkhead being arranged to prevent discharge of material from said flask when the flask is in normal position, a stop plate secured to said flask and adapted to stop the flow of material from said chute when the flask is rocked, and power means for rocking said flask.

5. In a loading device a downwardly inclined chute for conveying material, a rocking measuring flask having open ends pivotally mounted in said chute, means for regulating the inflow of material to said flask, a stop plate secured to the under side of said flask and adapted to stop the flow of material from said chute when said flask is rocked, and power means for rocking the flask.

6. In a loading device a downwardly inclined chute for conveying material, a rocking measuring flask pivotally mounted in said chute, a stop plate secured to the under side of said flask and adapted to stop the flow of material from said chute when the flask is rocked, a discharge chamber secured below said flask adapted to receive the measured material therefrom, and a swinging gate on said chamber, said gate being constructed and arranged to prevent scattering of material as the material is discharged.

In witness whereof I have hereunto signed my name.

FREDERICK C. CARSTARPHEN.